United States Patent
Bell et al.

(10) Patent No.: US 7,555,489 B2
(45) Date of Patent: Jun. 30, 2009

(54) GENERATING A FINGERPRINT FOR A DOCUMENT

(75) Inventors: James Bell, Glenfield (GB); Megan A. Beynon, Coventry (GB); Benjamin P. Delo, Abingdon (GB); Andrew J. Flegg, Rugby (GB); Julian Friedman, Manchester (GB); Philipp Offermann, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 11/264,805

(22) Filed: Nov. 1, 2005

(65) Prior Publication Data

US 2006/0101069 A1    May 11, 2006

(30) Foreign Application Priority Data

Nov. 5, 2004   (GB)   ................. 0424479.4

(51) Int. Cl.
  *G06F 17/00*   (2006.01)
  *G06F 7/00*   (2006.01)
(52) U.S. Cl. ............... 707/101; 707/100; 707/103 R; 707/102
(58) Field of Classification Search ............ 707/100, 707/103 R, 101, 102
  See application file for complete search history.

(56) References Cited

U.S. PATENT DOCUMENTS 6,006,223 A  * 12/1999  Agrawal et al. ........... 707/5
6,167,369 A  * 12/2000  Schulze ................... 704/9
6,349,296 B1 * 2/2002  Broder et al. ............. 707/3

OTHER PUBLICATIONS

"Syntactic Clustering of the Web" Broder, Glassman, Manasse (discloses Shingling) http://decweb.ethz.ch/WWW6/Technical/Paper205/Paper205.html.

* cited by examiner

*Primary Examiner*—James Trujillo
*Assistant Examiner*—Bruce M Moser
(74) *Attorney, Agent, or Firm*—Stephen J. Walder, Jr.; Herman Rodriguez

(57) ABSTRACT

Mechanisms for generating a set of one or more elements of a fingerprint for a document, the document comprising a semantic construct having one or more ordered words, are provided. With these mechanisms, a range of sizes for a fingerprint element is defined and ordered words of the semantic construct are divided into a set of one or more mutually exclusive fingerprint elements. Each of the one or more mutually exclusive fingerprint elements includes a number of adjacent words, the number being within the range of sizes for a fingerprint element. Responsive to a determination that the set of mutually exclusive fingerprint elements excludes a word from the semantic construct, the excluded word is discarded.

5 Claims, 15 Drawing Sheets

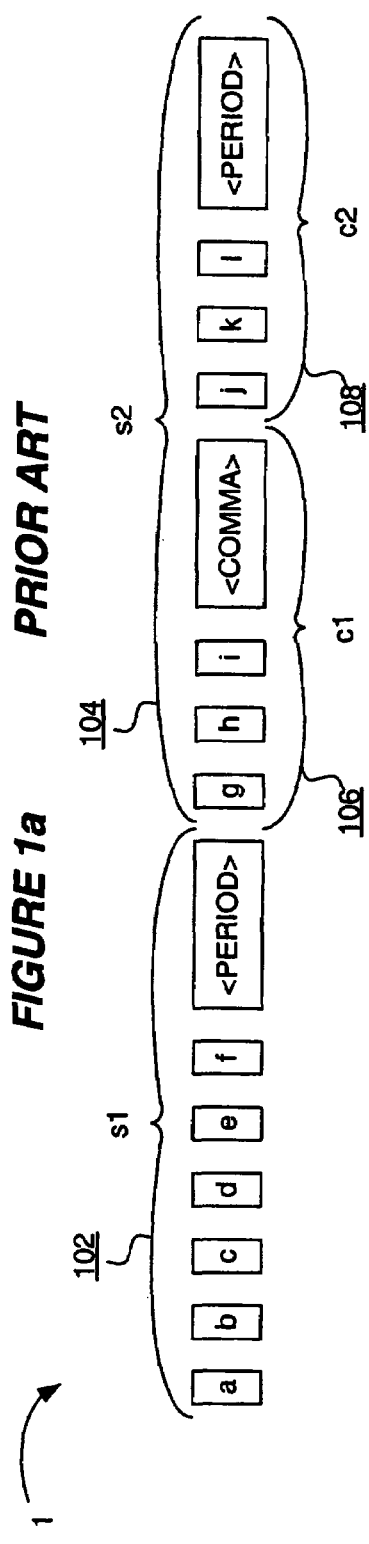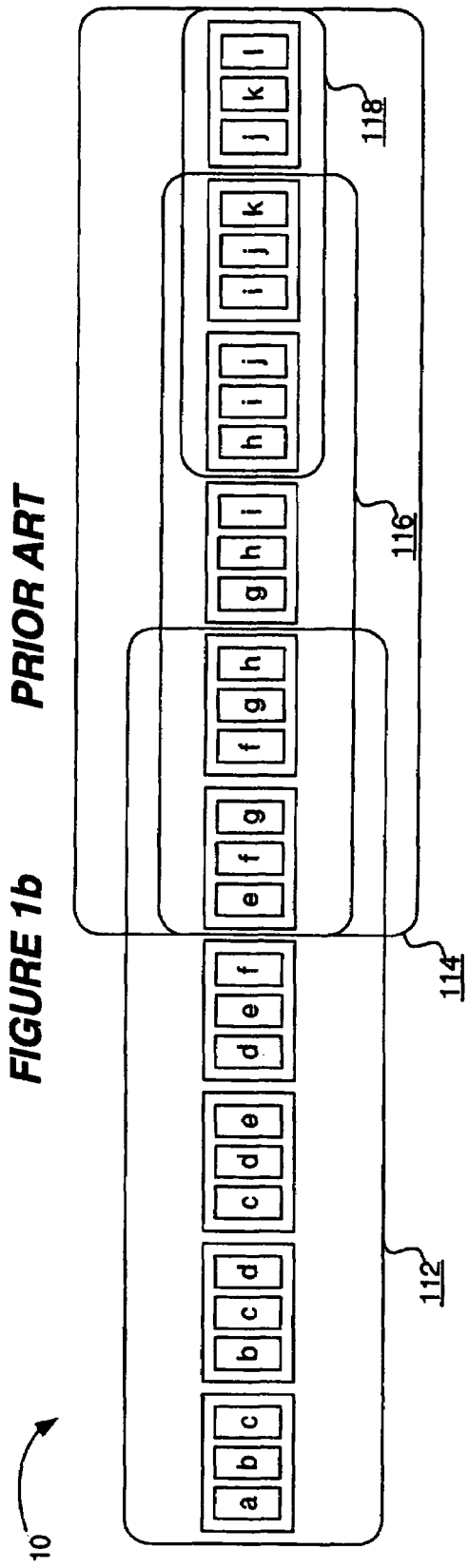

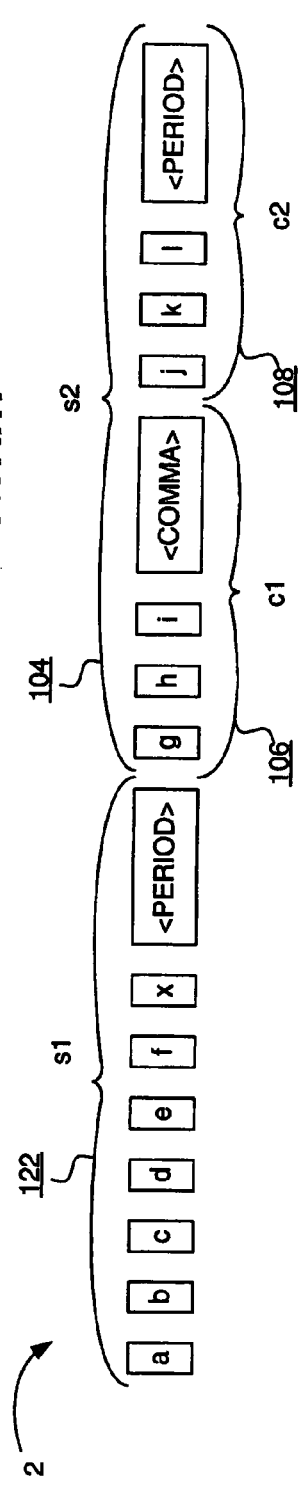
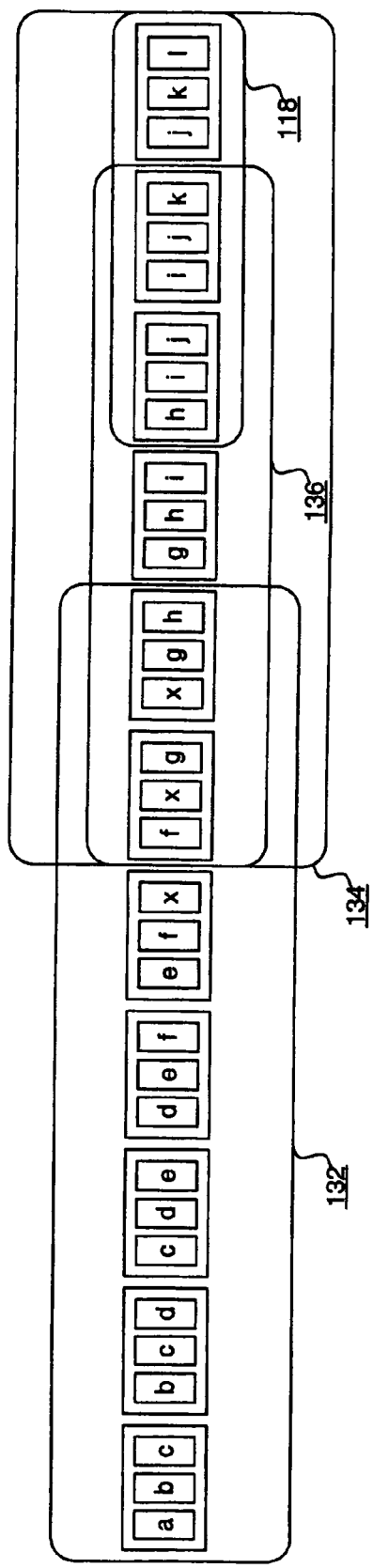

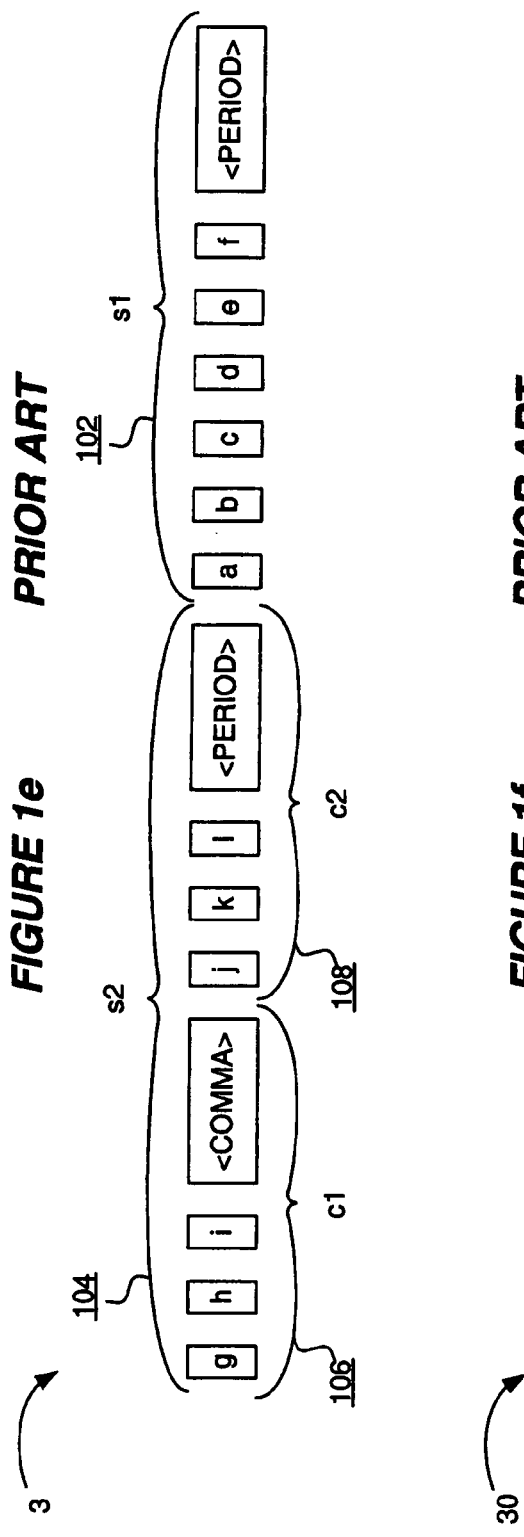
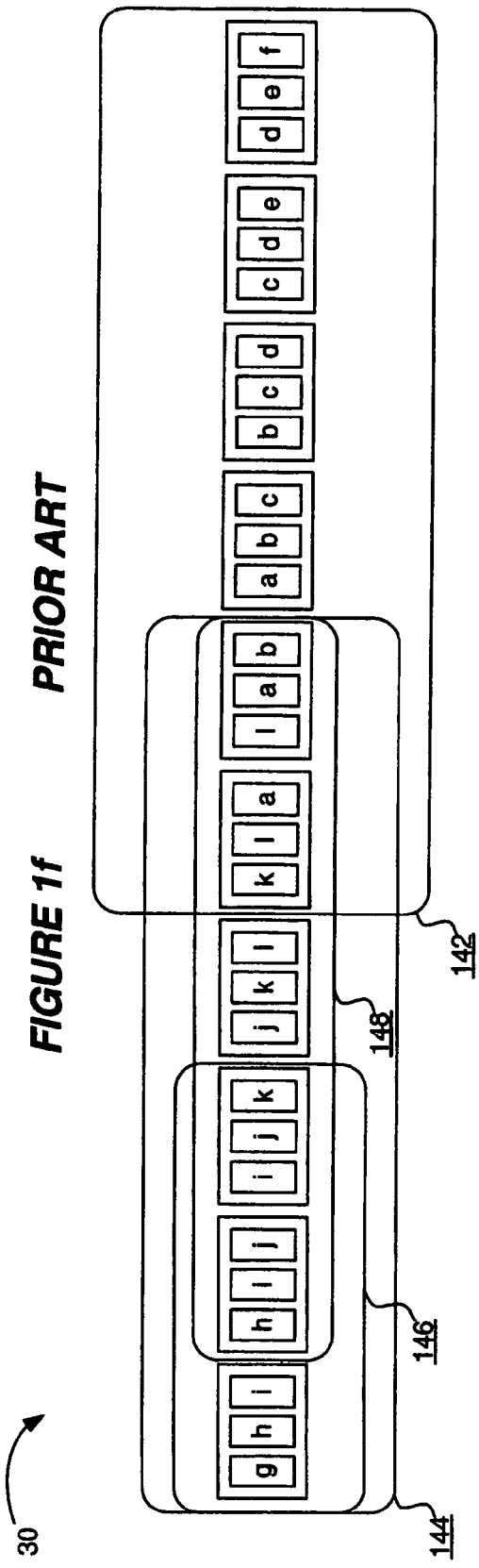

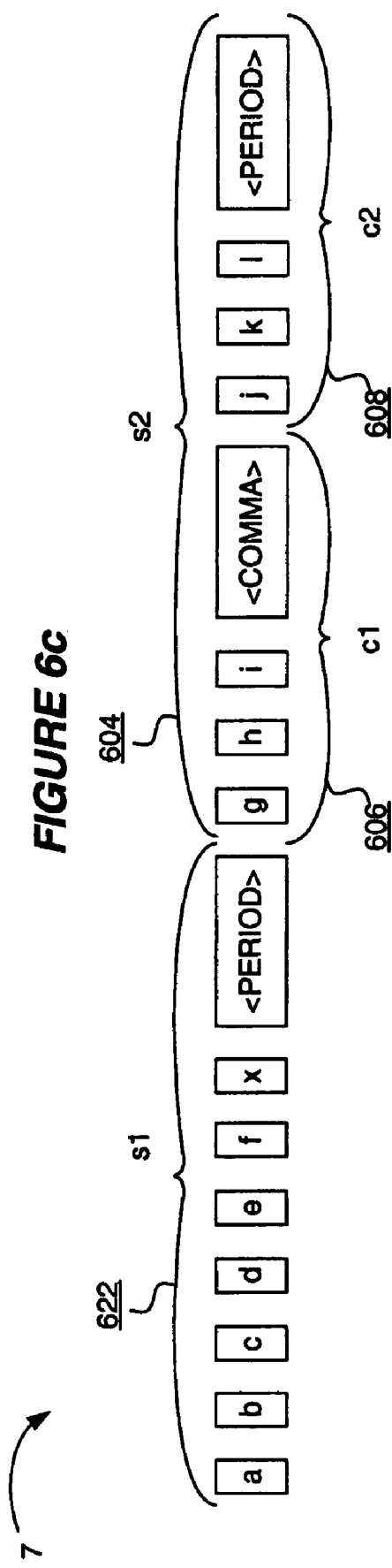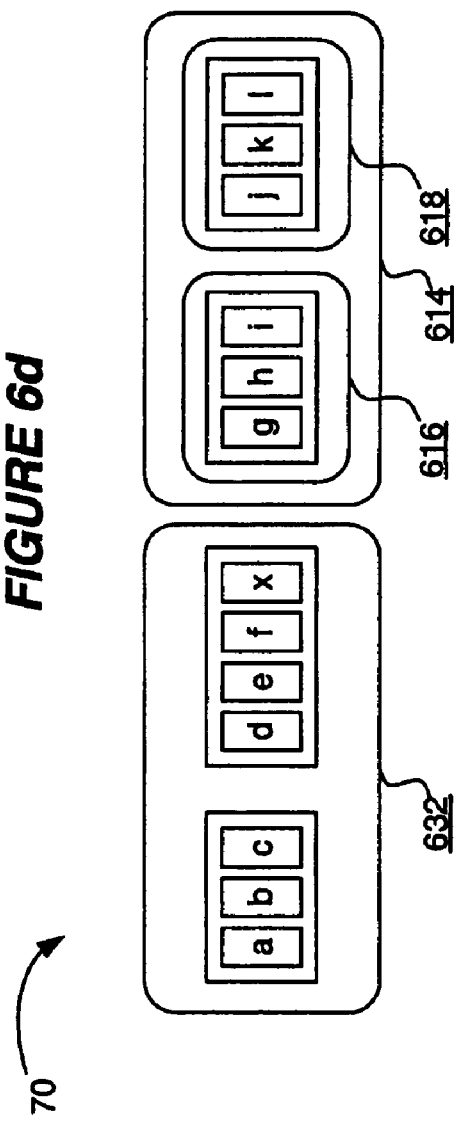

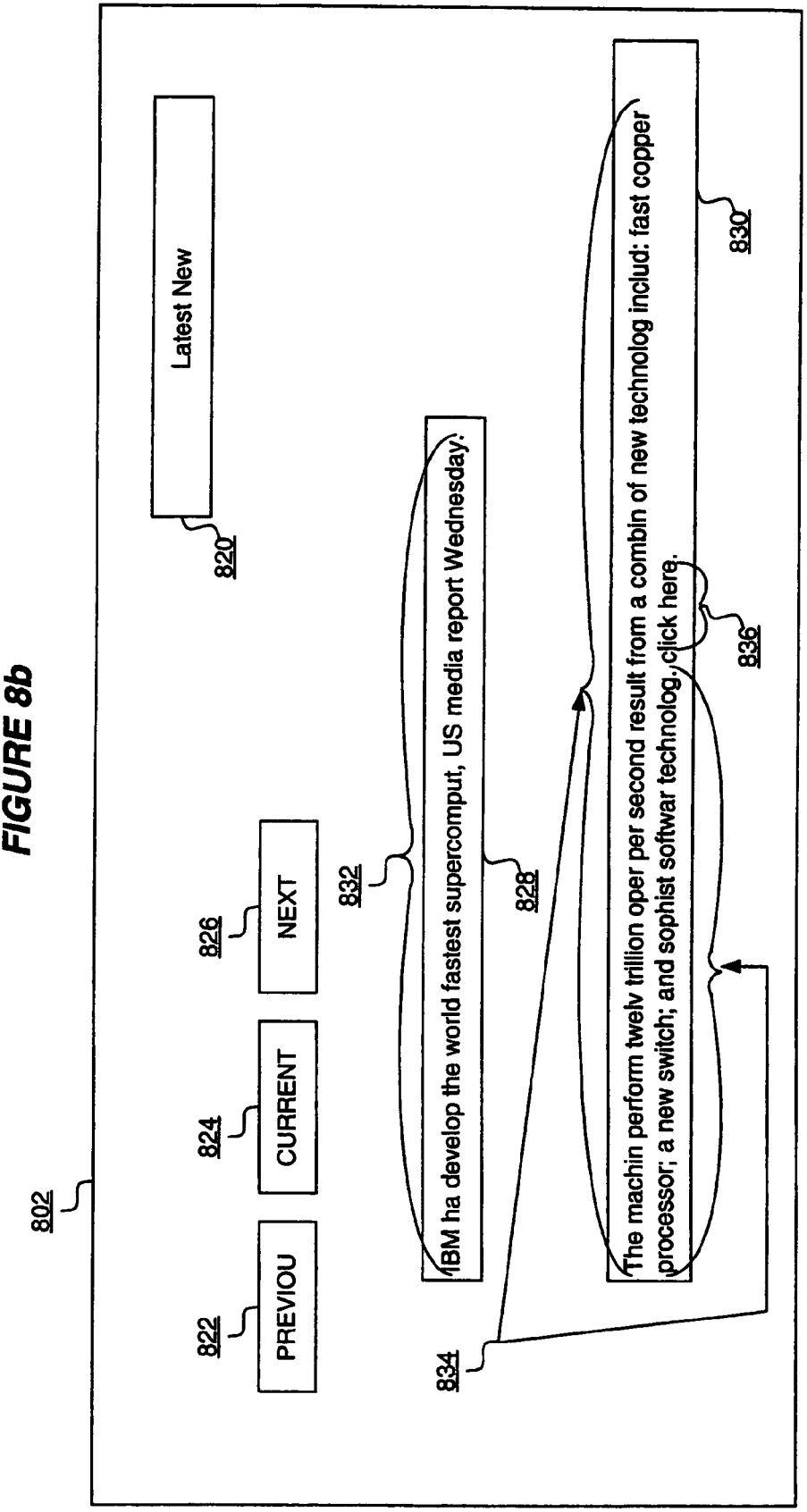

GENERATING A FINGERPRINT FOR A DOCUMENT

FIELD OF THE INVENTION

This invention relates to generating a fingerprint for a document. In particular it relates to generating a fingerprint which reflects only the substantive content of a document.

BACKGROUND OF THE INVENTION

It is possible for documents stored in an electronic form to link or refer to other electronic documents stored elsewhere. For example, a web page is a document published to a computer network which can be accessed by any computing entity with a valid connection to the network. Web pages can refer or link to other web pages located elsewhere on the same network. One problem with references between electronic documents is that the content of a referenced document may change or the referenced document may be relocated on the network or removed altogether. It is therefore important for an owner of a document which includes references to verify the content of referenced documents and the continued existence of referenced documents at a referenced location. If the content of a referenced document is amended it may be necessary to compare the content of the amended document with the content of the document prior to amendment to ensure the document continues to be suitable for reference. Similarly, if a document is relocated or removed it is necessary to identify a new location of the document or a replacement document and to compare the content of the newly located or replacement document with the original document to ensure that it is suitable for reference. Such comparisons of the content of documents is often undertaken manually and is therefore time consuming and arduous. This is especially the case where compared documents are lengthy.

The content of a document can be considered as comprising substantive content and supplementary content. The substantive content of a document is that content which relates to the meaningful substance of the document in the context of the purpose or meaning of the document. In contrast, supplementary content in a document is that content which does not relate to the meaningful substance of the document, such as insignificant elements including links to other documents, advertisements or navigation features. It may also be appropriate to consider titles, headings and short annotations as supplementary content. In practice it can be useful to distinguish between the substantive content of a document and supplementary content of a document in terms of the number of words making up such content. For example, short paragraphs or lines of text consisting of fewer than three words are unlikely to constitute complete sentences with substantive meaning. Such short paragraphs or lines typically relate to document links (such as web page hyperlinks). Thus, for a given document, it may be defined that paragraphs consisting of fewer than three words constitute supplementary content of the document. All other content may constitute substantive content. Supplementary content within documents can be ignored when comparing the contents of documents. Similarly, two documents may differ in only an insignificant respect, such as difference in use of punctuation, layout, formatting, wording or style. These differences may have no impact on the substantive content of a document but nonetheless a literal comparison of the documents would identify these as differences. Such problems make it difficult to automate a method for the comparison of documents, such as through a computer program, since such automatic methods are inherently pedantic in their approach to comparison.

It would therefore be advantageous to provide a fingerprint for a document which reflects only the substantive content of the document and which is smaller than the document itself. Further, if the substantive content of the document is changed, it would be advantageous if the fingerprint for the document also changes to a measurable extent corresponding to the change to the substantive content of the document. I.e. The significance of the change to the document meaning would be reflected by an equivalent significance of change to the fingerprint. Thus, two documents can be compared by comparing their associated fingerprints. Any differences between the substantive content of the documents would result in a measurable and equivalent difference between the fingerprints of the documents.

One technique for providing a fingerprint for a document reflecting the content of the document is known as hashing. Hashing is a technique for generating a digest, such as a numerical value, corresponding to an input element such as a document. For example, the Message Digest 5 algorithm (MD5) is disclosed in RFC 1321 available from the world wide web at www.faqs.org/rfcs/rfc1321.html. This algorithm takes as input a document of arbitrary length and produces as output a digest of the document which is based on the content of the document. It is commonly accepted in the art that it is computationally infeasible to produce two documents with different content having the same document digest, or to produce any document having a particular document digest using the MD5 algorithm. Whilst the MD5 algorithm provides a fingerprint for a document, it does so for the whole contents of a document and does not distinguish the substantive content. Furthermore, a change to the document does not result in a measured change to the fingerprint generated by the MD5 algorithm. In fact, a small change to the content of a document can result in a radically different MD5 digest. Thus, comparing MD5 digests for two documents gives no indication of the similarity of the two documents themselves.

Another approach for generating a fingerprint for a document is known as shingling. Shingling is a method for generating a representation of the content of the document based on a set of shingles. A shingle is a contiguous subsequence of elements, such as words, contained in a document. The number of elements contained in a shingle is defined as the shingle size. The set of shingles for a document is the set of all unique shingles having the shingle size contained in the document. The shingling approach to generating a fingerprint for a document will now be considered with reference to FIGS. 1a to 1f.

FIG. 1a is a representation of a document 1 including sentences, clauses, words and punctuation. Document 1 comprises a set of words represented by the elements of the document labelled 'a' to 'l'. The document includes two sentences, s1 102 and s2 104. Sentence s1 102 is separated from sentence s2 104 by punctuation, in particular, 'PERIOD'. Sentence s1 102 is thus comprised of words 'a' to 'f'. Sentence s2 104 is comprised of words 'g' to 'l'. Sentence s2 104 is further divided into clauses c1 106 and c2 108 which are divided by 'COMMA', and terminated by a further 'PERIOD' in clause c2 108. Document 1 can be divided into a set of shingles for a given shingle size. Taking a shingle size of three words, for example, a first shingle of document 1 includes the first three words 'a', 'b' and 'c'. A second shingle of document 1 includes the second three words 'b', 'c' and 'd' and so on.

FIG. 1b is a representation of a set of shingles 10 with a shingle size of three words for the document 1 of FIG. 1a according to methods of the prior art. As can be seen from FIG. 1b a complete shingling of document 1 results in a set 10 of ten shingles starting with {'a', 'b', 'c' } and ending with {'j', 'k', 'l'}. The set of shingles 10 therefore includes thirty words in total (a total number of words in all of the shingles). Thus, the set of shingles 10 is larger than the number of words in the original document 1 which included only twelve words ('a' to 'l'). This results in a drawback of the shingling technique in that a comparison of documents by comparing sets of shingles results in comparing more elements than comparing the content of the documents themselves.

FIG. 1b is also annotated to include an indication of which shingles correspond to the semantic constructs of document 1. Thus, set of shingles 112 corresponds to the words included in sentence s1 102. Set of shingles 114 corresponds to the words included in sentence s2 104. Further, set of shingles 114 includes subset 116 corresponding to clause c1 106 and subset 118 corresponding to clause c2 108. It is noted that sets 112 and 114 intersect and that the two shingles {'e', 'f', 'g'} and {'f', 'g', 'h'} relate to both sentence s1 102 and sentence s2 104. Similarly, sets 116 and 118 intersect and the two shingles {'h', 'i', 'j'} and {'i', 'j', 'k'} relate to both clause c1 106 and c2 108. Thus the existence of semantic constructs (such as 'PERIOD' and 'COMMA') in the substantive content of document 1 has no effect on the set of shingles 10 generated for document 1. This has the drawback that changes to the semantic structure of a document (e.g. Removal or addition of punctuation) does not affect a set of shingles generated for the document.

FIG. 1c is a representation of a document 2 which corresponds to the document 1 with the addition of a word 'x' at the end of the first sentence s1 122. In every other way the document 2 is identical to the document 1 and shall not be described in further detail. FIG. 1d is a representation of a set of shingles 20 with a shingle size of three words for the document 2 of FIG. 1c according to methods of the prior art. By comparing the set of shingles 20 for document 2 with the set of shingles 10 for document 1 it can be seen that the addition of the word 'x' at the end of sentence s1 122 has resulted in a change to the set of shingles 20 for the document 2. In particular, shingles including the word 'x' have been introduced. FIG. 1d is also annotated to include an indication of which shingles correspond to the semantic constructs of document 2. Thus, set of shingles 132 corresponds to the words included in sentence s1 122. Set of shingles 134 corresponds to the words included in sentence s2 104, and so on. These sets of shingles 132 and 134 for document 2 can be compared with the corresponding sets of shingles 112 and 114 for document 1 to quantify the change in the set of shingles for each sentence s1 122 and s2 104 following the addition of the word 'x' to sentence s1 122. It can be seen that whilst the word 'x' only affects sentence s1 122 in the substantive content of the document 2, set of shingles 132 for sentence s1 122 and set of shingles 134 for sentence s2 104 are both affected. Thus shingling has the drawback that changes to one semantic construct (such as sentence s1 122) affects the shingles generated with respect to a separate semantic construct (such as s2 104).

FIG. 1e is a representation of a document 3 which corresponds to the document 1 with the sentence s1 102 swapped with the sentence s2 104. In every other way document 3 is identical to the document 1 and in particular, the swapping of sentence s1 102 with sentence s2 104 does not change the substantive content of document 3 as compared with document 1. FIG. 1f is a representation of a set of shingles 30 with a shingle size of three words for the document 3 of FIG. 1e according to methods of the prior art. As can be seen from FIG. 1f a complete shingling of document 3 results in a set 30 of ten shingles starting with {'g', 'h', 'i' } and ending with {'d', 'e', 'f' }. FIG. 1f is also annotated to include an indication of which shingles correspond to the semantic construct of document 3. Thus, set of shingles 144 corresponds to the words included in sentence s2 104. Set of shingles 142 corresponds to the words included in sentence s1 102. Further, set of shingles 144 includes subset 146 corresponding to clause c1 106 and subset 148 corresponding to clause c2 108. Whilst the substantive content of document 3 is identical to that of document 1 it can be seen that the set of shingles 30 for document 3 differs from the set of shingles 10 for document 1. An approach to quantifying the similarity of documents by sets of shingles is disclosed in the document "Syntactic Clustering of the Web" by Broder et al. (Computer Networks and ISDN Systems, September 1997, Volume 29, no. 8, pp 1157-1166). This approach defines that, for a given shingle size, the containment of a set of shingles A in a set of shingles B is:

$$C(A, B) = \frac{|A \cap B|}{|A|}$$

where |X| is the size of set X. Applying this to the sets of shingles 10 and 30, with A corresponding to the set of shingles 10 and B corresponding to the set of shingles 30, the containment can be calculated as:

$$C(A, B) = \frac{|A \cap B|}{|A|} = \frac{7}{10} = 0.7$$

Thus, even though the substantive content of documents 1 and 3 is identical, the similarity quantified by the containment of the set of shingles 10 in the set of shingles 30 is '0.7' or 70%. Shingling thus has the drawback that a mere rearrangement of the semantic construct of a document can cause a significantly different set of shingles.

Thus, whilst shingling provides a technique for representing the content of a document, it is not limited to representing the substantive content of the document and it does not accommodate the significance or insignificance of semantic construct within the document. Consequently, the extent of a change to a document for which a set of shingles is generated is not measurably reflected in a regenerated set of shingles for the document.

Thus there exists a need to provide a method for generating a fingerprint for a document which overcomes these drawbacks and provides the advantageous features described above. In particular, the advantageous features of: providing a fingerprint for a document which reflects only the substantive content of the document and which is smaller than the document itself; the fingerprint reflecting the organisation of the document into semantic constructs; the fingerprint changing to a measurable extent corresponding to a change to the substantive content of the document; and the fingerprint being unaffected by mere rearrangement of the content of the document.

SUMMARY

In one illustrative embodiment, a method for generating a set of one or more elements of a fingerprint for a document is provided, the document comprising a semantic construct having a plurality of text portions comprising one or more ordered words. The method comprises defining a range of sizes for a fingerprint element, the range of sizes comprising a minimum size and a maximum size. The method further comprises determining, for each text portion of the document, whether a size of the text portion is equal to or greater than the minimum size and equal to or Less than the maximum size of the range of sizes for a fingerprint element. Moreover, the method comprises excluding one or more text portions of the document from inclusion as a mutually exclusive fingerprint element in a set of one or more mutually exclusive fingerprint elements if a size of the one or more text portions is not equal to or greater than the minimum size and is not equal to or less than the maximum size of the range of sizes for the fingerprint element. In addition, the method comprises dividing the ordered words of the semantic construct into the set of one or more mutually exclusive fingerprint elements. Each of the one or more mutually exclusive fingerprint elements includes a number of adjacent words, the number being within the range of sizes for a fingerprint element.

The method also comprises comparing a first document with a second document. Comparing the first document with the second document comprises generating a first set of fingerprint elements from the first document, generating a second set of fingerprint elements from the second document, and calculating a similarity index as a size of an intersect of the first set of fingerprint elements and the second set of fingerprint elements divided by a size of the first set of fingerprint elements.

These and other features and advantages of the illustrative embodiments will be described in, or will become apparent to those of ordinary skill in the art in view of, the following detailed description of the illustrative embodiments.

BRIEF DESCRIPTION OF THE DRAWINGS

A preferred embodiment of the present invention will now be described, by way of example only, with reference to the accompanying drawings, in which:

FIG. 1a is a representation of a document including sentences, clauses, words and punctuation;

FIG. 1b is a representation of a set of shingles with a shingle size of three words for the document of FIG. 1a according to methods of the prior art;

FIG. 1c is a representation of a document which corresponds to the document of FIG. 1a with the addition of a word 'x' at the end of the first sentence s1;

FIG. 1d is a representation of a set of shingles with a shingle size of three words for the document of FIG. 1c according to methods of the prior art;

FIG. 1e is a representation of a document which corresponds to the document of FIG. 1a with the sentence s1 swapped with the sentence s2;

FIG. 1f is a representation of a set of shingles with a shingle size of three words for the document of FIG. 1e according to methods of the prior art;

FIG. 6c is a representation of a document which corresponds to the document of FIG. 6a with the addition of a word 'x' at the end of the first sentence s1;

FIG. 6d is a representation of a fingerprint consisting of fingerprint elements having sizes in the range of three to four words for the document of FIG. 6c in accordance with a preferred embodiment of the present invention;

FIG. 8b is a representation of the web page of FIG. 8a which has been word stemmed using a word stemming algorithm known in the art.

DETAILED DESCRIPTION OF THE PREFERRED EMBODIMENT

Figure 2:
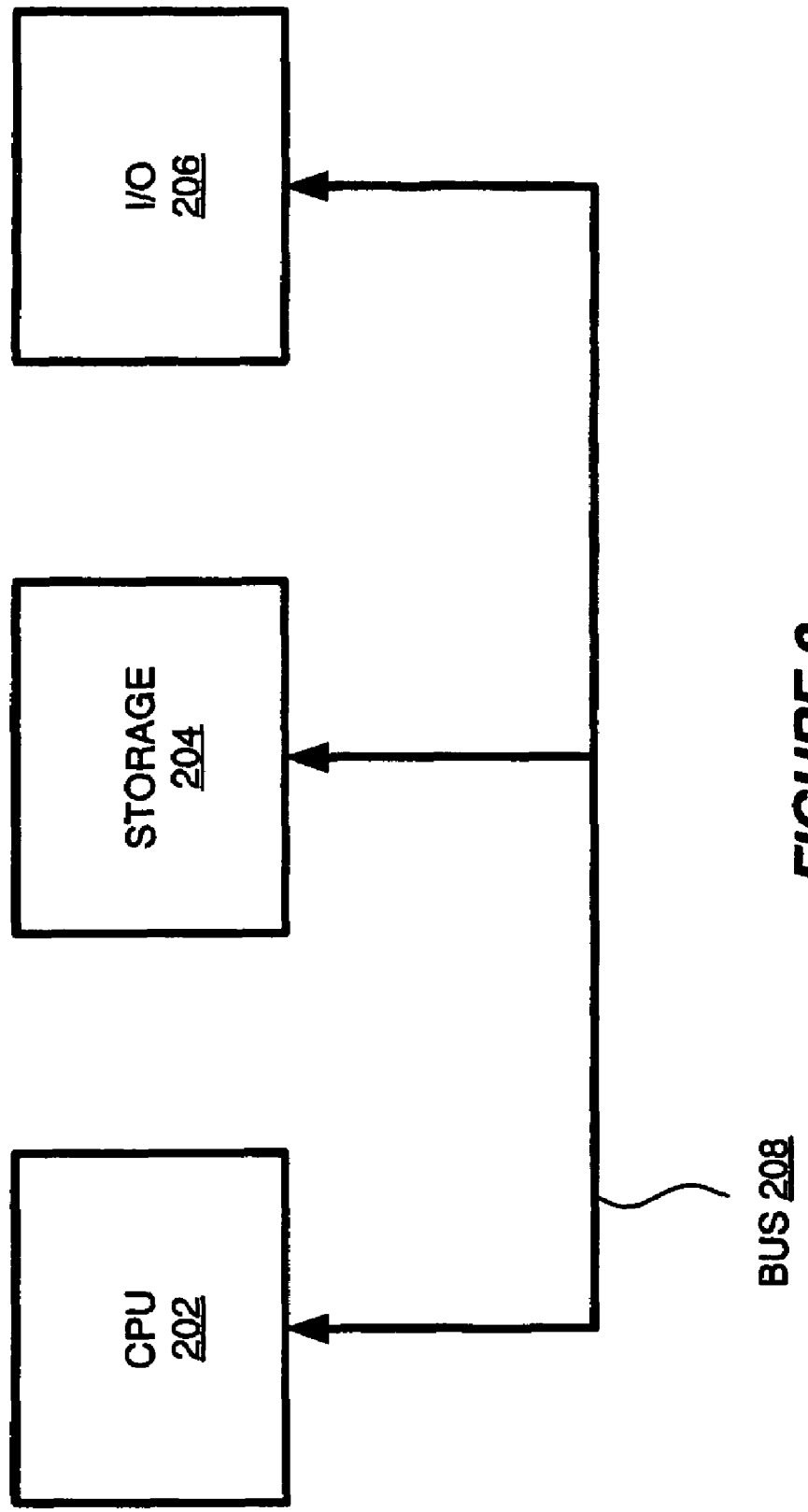
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3B:
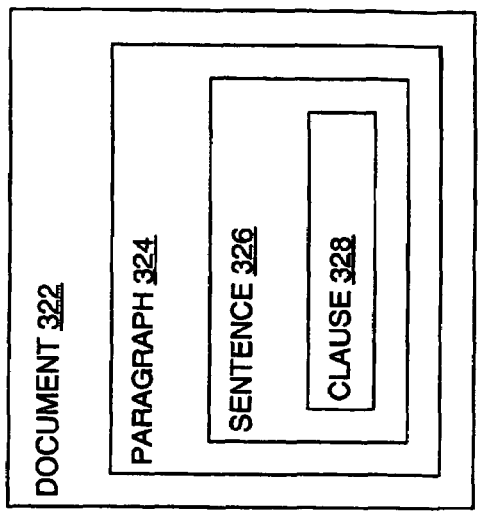
FIG. 3b illustrates how semantic constructs can be nested within a document in accordance with the semantic construct precedence of Table 1.
Figure 3A:
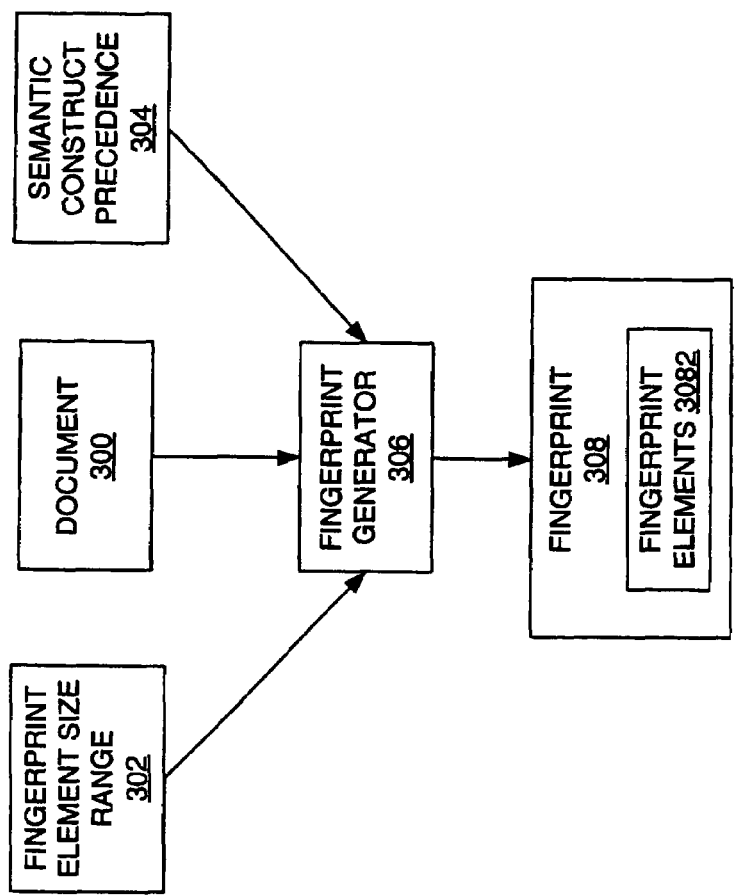
FIG. 3a is a block diagram of the flow of information into and out of a fingerprint generator in accordance with a preferred embodiment of the present invention.

FIG. 3a is a block diagram of the flow of information into and out of a fingerprint generator 306 in accordance with a preferred embodiment of the present invention. The fingerprint generator 306 is a software or hardware component for generating a fingerprint 308 for a document 300. Methods of the fingerprint generator 306 are considered in detail with respect to FIG. 4 below. The fingerprint 308 reflects only the substantive content of the document 300 and is smaller in size than the document 300 itself. Fingerprint 308 includes one or more fingerprint elements 3082. A fingerprint element 3082 comprises one or more words from the document 300. The number of words included in each of the fingerprint elements 3082 is determined by the fingerprint element size range 302 which is a range of sizes of fingerprint elements. For example, if the fingerprint size range 302 is six to ten words, the fingerprint generator 306 generates the fingerprint 308 with fingerprint elements comprising from six to ten words each.

Semantic construct precedence 304 is an ordered list of semantic constructs for documents. Semantic constructs include paragraphs, sentences, clauses, expression in parentheses, semicolon or colon separated entries, phrases (such as quoted phrases), hyphenated words, hyphenated sentences etc. An exemplary semantic construct precedence 304 is provided in Table 1

TABLE 1

| Precedence | Semantic Construct |
|---|---|
| 1 | Document |
| 2 | Paragraph |
| 3 | Sentence |
| 4 | Clause |

The semantic construct precedence 304 illustrated in Table 1 indicates how documents take precedence over paragraphs, sentences and clauses. Further, paragraphs take precedence over sentences and clauses and sentences take precedence over clauses. The precedence of semantic constructs defines how, for a given document, semantic constructs can be nested within each other. FIG. 3b illustrates how semantic constructs can be nested within a document in accordance with the semantic construct precedence 304 of Table 1. Thus, a document 322 includes a paragraph 324. The paragraph includes a sentence 326 which itself includes a clause 328. The semantic construct precedence 304 is used by the fingerprint generator 306 to break down the content of a document when generating the fingerprint 308 as will be considered in detail with respect to FIG. 4 below.

Figure 3C:
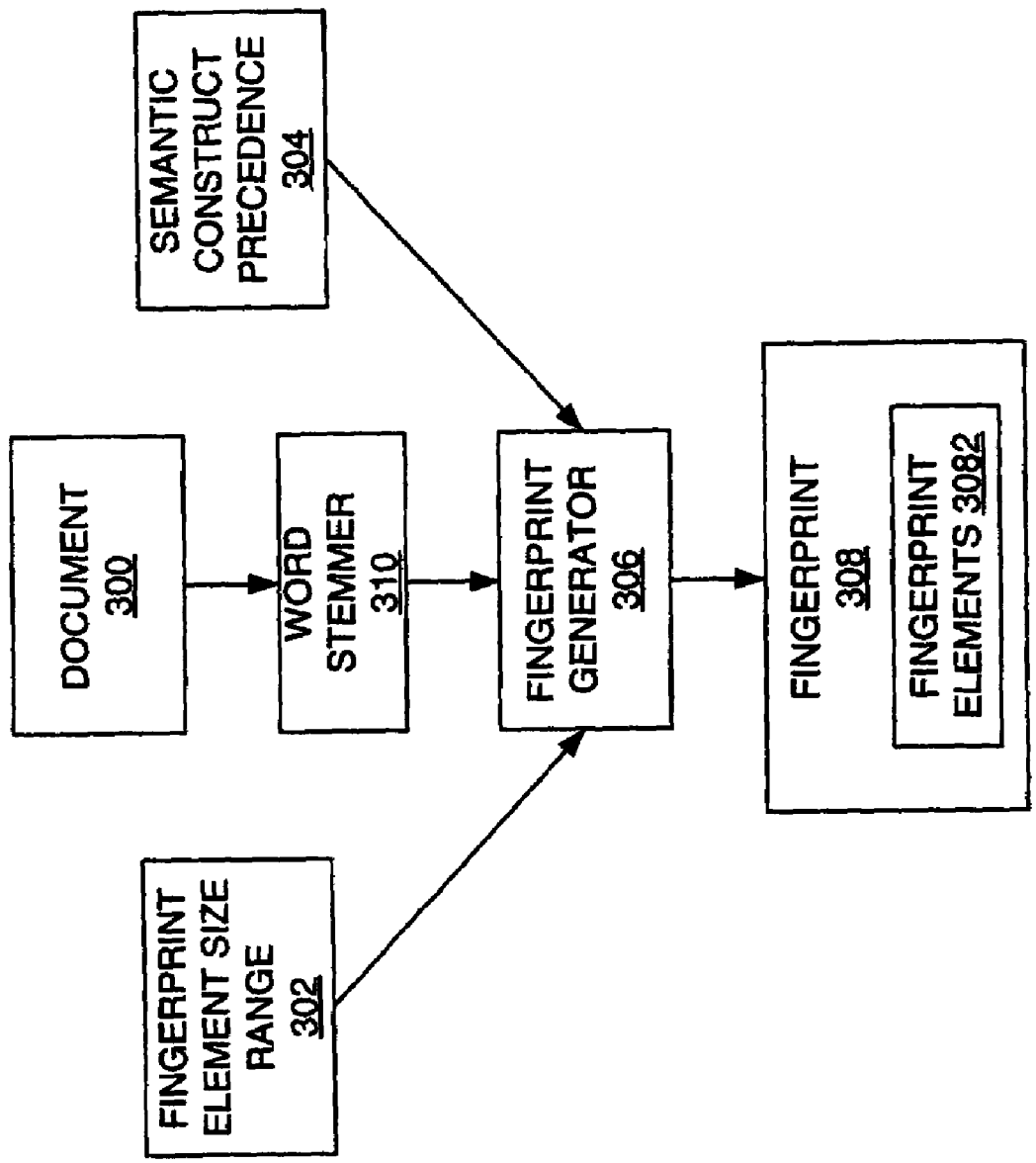
FIG. 3c is a block diagram of the flow of information into and out of a fingerprint generator in accordance with an alternative embodiment of the present invention.

FIG. 3c is a block diagram of the flow of information into and out of a fingerprint generator 306 in accordance with an alternative embodiment of the present invention. Most of the elements of FIG. 3c are identical to those described above with respect to FIG. 3a and these will not be repeated here. FIG. 3c further includes a word stemmer 310 which stems words in the document 300 using a word stemming algorithm well known in the art (such as that described on the world wide web at www.tartarus.org/~martin/PorterStemmer or that provided on the world wide web at cpk.auc.dk/~tb/stemmer/stemit.php). Word stemming is a process for removing morphological and infexional endings from words in order to normalise variants of words. For example, a stemmed version of the previous sentence might read "Word stem i a process for remov morpholog and inflexion end from word in order to normalis variant of word". A version of the document 300 which has been word stemmed by the word stemmer 310 can be processed by the fingerprint generator 306 to generate the fingerprint 308. Word stemming the document 300 before generating the fingerprint 308 results in a fingerprint 308 which reflects a normalised version of the document 300. This is advantageous when comparing fingerprint 308 with a fingerprint of a second document since small variations in the use of words in documents will be normalised by the word stemmer 310. Consequently, differences between documents due to morphological and inflexional endings of words result in no difference between aspects of compared fingerprints relating to those words. Alternatively, or additionally, a list of common words which have no significance on the substantive meaning of the document can be maintained. Prior to generating a fingerprint, words in the list can be disregarded from the content of the document. For example, words such as "the" and "a" might be disregarded.

Figure 4:
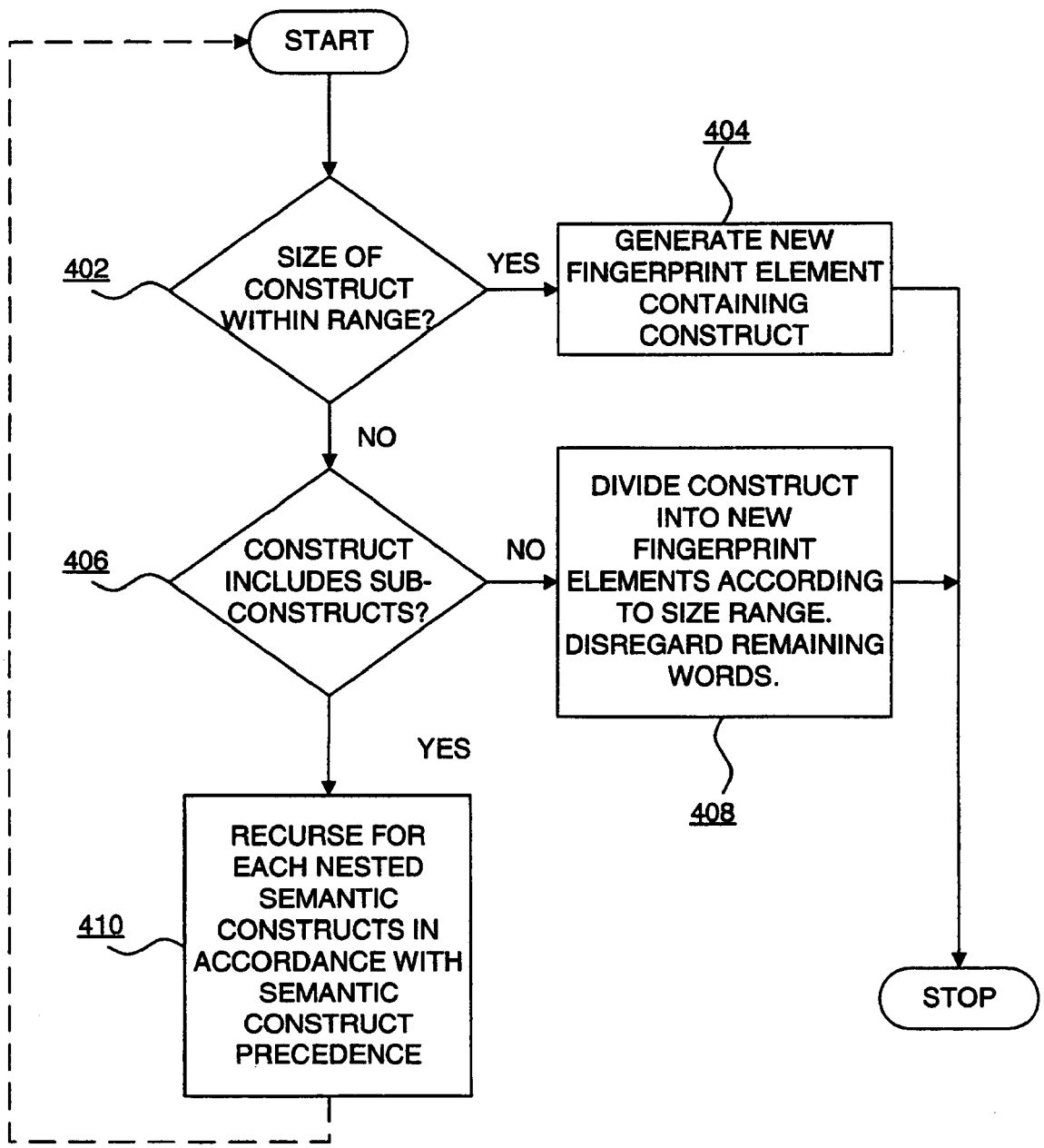
FIG. 4 is a flowchart illustrating a method of the fingerprint generator of FIGS. 3a and 3c in accordance with a preferred embodiment of the present invention.

FIG. 4 is a flowchart illustrating a method of the fingerprint generator 306 of FIGS. 3a and 3c in accordance with a preferred embodiment of the present invention. The method of FIG. 4 processes a semantic construct included within the document 300. The semantic construct can contain further nested semantic constructs with a lower precedence according to the semantic construct precedence 304. Under some circumstances the method of FIG. 4 will operate recursively to process such nested semantic constructs. The method of FIG. 4 will first be considered in detail before being applied in use by way of example with reference to FIGS. 6a to 6f, 7 and 8.

Starting at step 402 for a current semantic construct, step 402 determines if the size of the current semantic construct is within the fingerprint element size range 302. The size can be measured, and the fingerprint element size range 302 can be specified, in terms of a number of words. If the size of the semantic construct is within the fingerprint element size range 302 a new fingerprint element is generated containing the semantic construct at step 404 and the method terminates for the current semantic construct. Alternatively, if the size of the semantic construct is not within the fingerprint element size range 302, the method determines at step 406 if the semantic construct includes nested semantic constructs. For example, if the current semantic construct is a sentence, the method determines at step 406 if the sentence includes clauses. If the current semantic construct does include nested semantic constructs, the method of FIG. 4 is recursed for the nested semantic constructs which have the highest precedence according to the semantic construct precedence 304 at step 410. Alternatively, if the current semantic construct does not include nested semantic constructs, the current semantic construct is divided into new fingerprint elements, each fingerprint element having a size which falls within the fingerprint element size range 302 at step 408. If, at step 408, it is not possible to divide all or part of the current semantic construct into fingerprint elements because it is smaller than the minimum size in the fingerprint element size range, that part of the current semantic construct which is too small is disregarded. Thus, content within the document 300 which is smaller than the minimum size in the fingerprint element size range 302, such as document links, advertisements or annotations, are not used in the generation of the fingerprint 308. In this way the fingerprint generator 306 generates a fingerprint 308 comprising a set of one or more fingerprint elements 3082, each element comprising words from the document 300.

Figure 5:
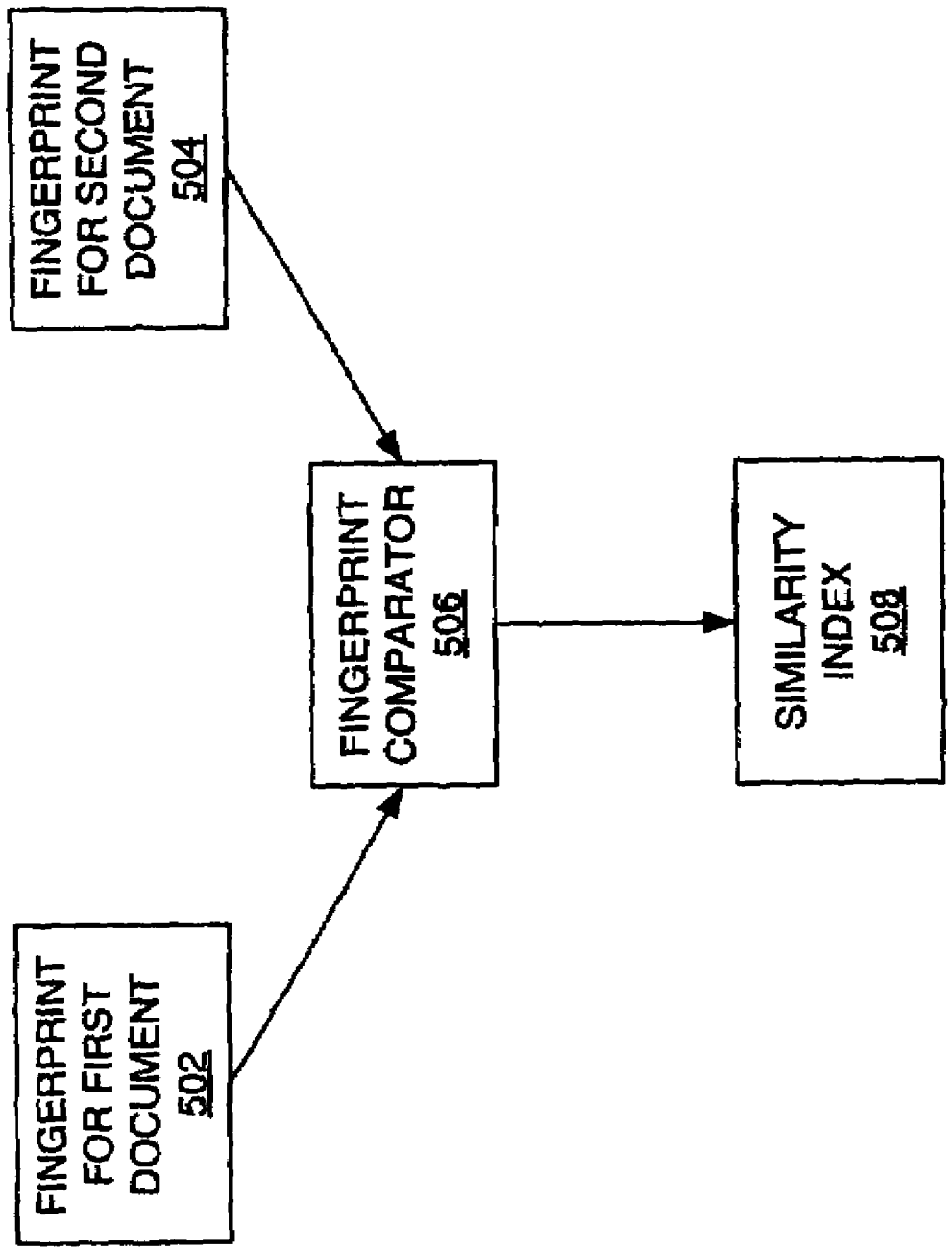
FIG. 5 is a block diagram of the flow of information into and out of a fingerprint comparator in accordance with a preferred embodiment of the present invention.

Once generated, a fingerprint for a first document can be compared with a fingerprint for a second document to determine the similarity of the substantive content of the first and second documents. FIG. 5 is a block diagram of the flow of information into and out of a fingerprint comparator 506 in accordance with a preferred embodiment of the present invention. The fingerprint comparator 506 takes as input a fingerprint for a first document 502 and a fingerprint for a second document 504. The comparator 506 processes the fingerprints 502 and 504 to generate a similarity index 508. An example of a formula for calculating the similarity index 508 is known in the art as:

$$C(A, B) = \frac{|A \cap B|}{|A|}$$

Here, A and B are fingerprints for two documents to be compared. The similarity index 508 generated by such a formula will lie in a range from zero to one, with indices towards a value of one representing increasing similarity. This allows a quantification of the similarity of the substantive content of two documents by comparison of their respective fingerprints generated in accordance with the preferred embodiments of the present invention.

Figure 6A:
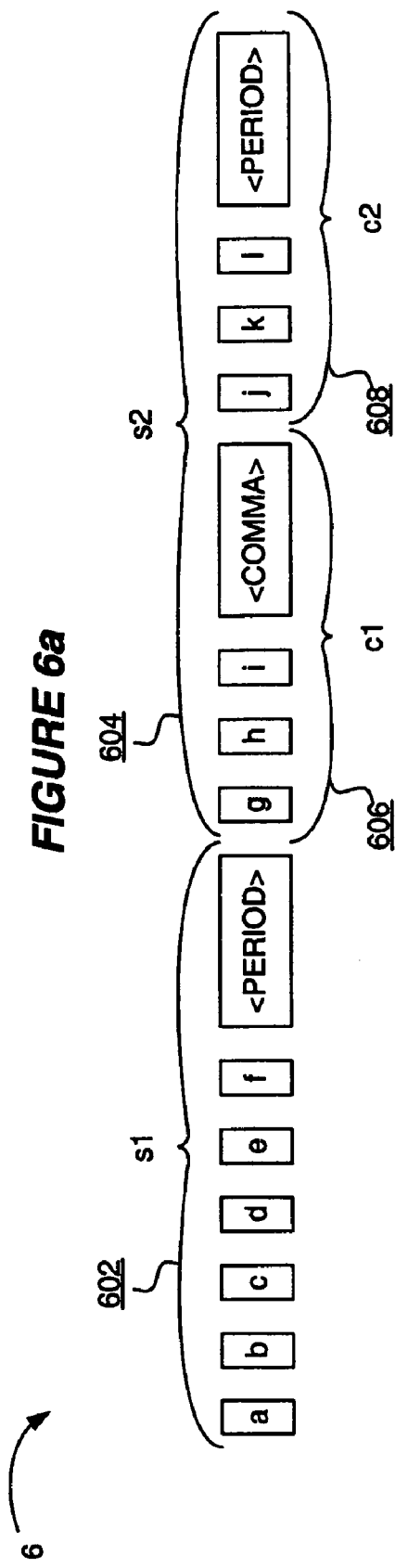
FIG. 6a is a representation of a document including sentences, clauses, words and punctuation for processing by a method in accordance with a preferred embodiment of the present invention.

FIG. 6a is a representation of a document 6 including sentences, clauses, words and punctuation for processing by a method in accordance with a preferred embodiment of the present invention. The document 6 of FIG. 6a is identical to that described above with respect to FIG. 1a. Document 6 will now be considered for the method of the fingerprint generator 306 of FIG. 4 with a fingerprint element size range 302 of three to four words and the semantic construct precedence of Table 1. Taking a first semantic construct as the entire document 6, step 402 determines if the size of the current semantic construct is within the fingerprint element size range 302. The entire document 6 includes twelve words ('a' to 'l') and is therefore outside the fingerprint element size range 302 of three to four words. The method therefore proceeds to step 406, where a determination is made of whether the current semantic construct includes nested semantic constructs. The current semantic construct is the entire document 6, which includes sentences s1 602 and s2 604. The method therefore proceeds to step 410 where the method of FIG. 4 is recursed for each of the sentences s1 602 and s2 604.

Considering first a recursion of the method of FIG. 4 for the sentence s1 602, step 402 determines if the size of the sentence s1 602 is within the fingerprint element size range 302. Sentence s1 602 includes six words ('a' to 'f') and is therefore outside the fingerprint element size range 302 of three to four words. The method therefore proceeds to step 406, where a determination is made of whether the sentence s1 602 includes nested semantic constructs. Sentence s1 602 does not include nested semantic constructs and so the method proceeds to step 408. At step 408 sentence s1 602 is divided into new fingerprint elements, each fingerprint element having a size which falls within the fingerprint element size range 302 of three to four words. Thus, sentence s1 602 can be divided into two fingerprint elements: {'a', 'b', 'c'} and {'d', 'e', 'f'}.

Considering next a recursion of the method of FIG. 4 for the sentence s2 604, step 402 determines if the size of the sentence s2 604 is within the fingerprint element size range 302. Sentence s2 604 includes six words ('g' to 'l') and is therefore outside the fingerprint element size range 302 of three to four words. The method therefore proceeds to step 406, where a determination is made of whether the sentence s2 604 includes nested semantic constructs. Sentence s2 604 does include nested semantic constructs: clauses c1 606 and c2 608. The method therefore proceeds to step 410 where the method of FIG. 4 is recursed for each of the clauses c1 606 and c2 608.

Considering first a recursion of the method of FIG. 4 for the clause c1 606 of sentence s2 604, step 402 determines if the size of clause c1 606 is within the fingerprint element size range 302. Clause c1 606 includes three words ('g', 'h' and 'i') and is therefore inside the fingerprint element size range 302 of three to four words. The method therefore proceeds to step 404 where a new fingerprint element is generated containing clause c1 606. Thus, from clause c1 606 the fingerprint element {'g', 'h', 'i'} is generated.

Finally, considering a recursion of the method of FIG. 4 for the clause c2 608 of sentence s2 604, step 402 determines if the size of clause c2 608 is within the fingerprint element size range 302. Clause c2 608 includes three words ('j', 'k' and 'l') and is therefore inside the fingerprint element size range 302 of three to four words. The method therefore proceeds to step 404 where a new fingerprint element is generated containing clause c2 608. Thus, from clause c2 608 the fingerprint element {'j', 'k', 'l'} is generated.

Figure 6B:
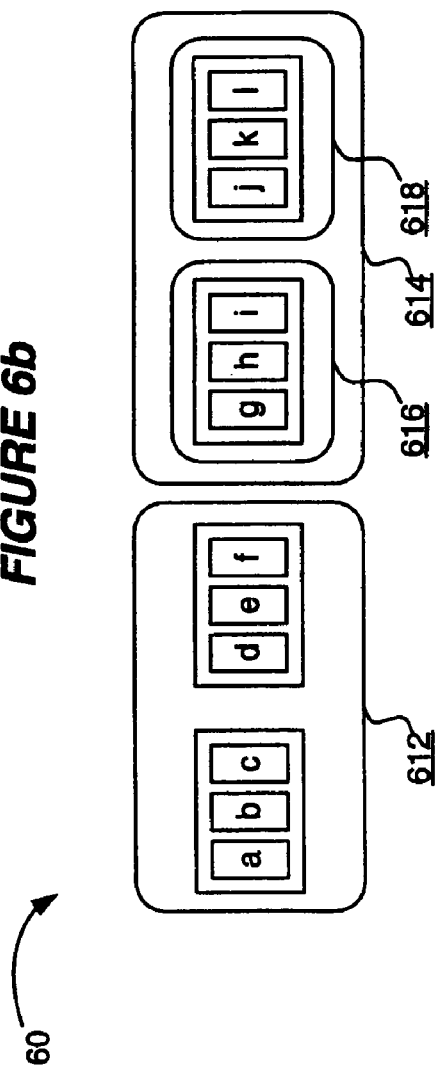
FIG. 6b is a representation of a fingerprint consisting of fingerprint elements having sizes in the range of three to four words for the document of FIG. 6a in accordance with a preferred embodiment of the present invention.

At this point, recursions for clause c1 606, clause c2 608, sentence s2 604 and sentence s1 602 are complete and the method of FIG. 4 terminates. In summary, four fingerprint elements 3082 were generated for document 6: {'a', 'b', 'c'}; {'d', 'e', 'f'}; {'g', 'h', 'i'}; and {'j', 'k', 'l'}. FIG. 6b is a representation of a fingerprint 60 consisting of fingerprint elements 3082 having sizes in the range of three to four words for the document 6 of FIG. 6a in accordance with a preferred embodiment of the present invention. FIG. 6b is also annotated to include an indication of which fingerprint elements 3082 correspond to the semantic constructs of document 6. Thus, set of fingerprint elements 612 corresponds to the words included in sentence s1 602. Set of fingerprint elements 614 corresponds to the words included in sentence s2 604. Further, set of fingerprint elements 614 includes subset 616 corresponding to clause c1 606 and subset 618 corresponding to clause c2 608. It is noted that the size of the fingerprint 60 is smaller than the size of document 6 because, for example, fingerprint 60 does not include the punctuation of document 6. Were document 6 to include supplementary content which was smaller than the fingerprint element size range 302 this would also not be included in the fingerprint 60 and so would further reduce the size of the fingerprint 60 relative to the document 6. It is also noted that the sets of fingerprint elements 612 and 614 corresponding to sentences s1 602 and s2 604 respectively do not intersect. This is a true reflection of the semantics of the content of document 6 in which these words are separated by means of sentences indicated by the period. Furthermore, neither of the sets of fingerprint elements 616 and 618 corresponding to clauses c1 606 and c2 608 of sentence s2 604 intersect with the set of fingerprint elements 612 corresponding to sentence s1 602. Again, this reflects the semantics of the content of document 6 where clauses c1 606 and c2 608 are wholly contained within sentence s2 604. In this way fingerprint elements 3082 are generated for the document 6 in accordance with the semantic structure of the document 6. Consequently, changes to the content of a single semantic construct in the document 6 will result in changes to only those fingerprint elements which correspond to that semantic construct. This is demonstrated by way of example below with respect to FIGS. 6c and 6d. Further, changes to the semantic structure of the document which do not change the substantive content of the document will result in an identical fingerprint. This is demonstrated by way of example below with respect to FIGS. 6e and 6f.

FIG. 6c is a representation of a document 7 which corresponds to the document 6 of FIG. 6a with the addition of a word 'x' at the end of the first sentence s1 622. In every other way the document 7 is identical to the document 6 and shall not be described in further detail. Document 7 will now be considered for the method of the fingerprint generator 306 of FIG. 4 with a fingerprint element size range 302 of three to four words and the semantic construct precedence of Table 1. Taking a first semantic construct as the entire document 7, step 402 determines if the size of the current semantic construct is within the fingerprint element size range 302. The entire document 7 includes thirteen words ('a', 'b', 'c', 'd', 'e', 'f', 'x', 'g', 'h', 'i', 'j', 'k' and 'l') and is therefore outside the fingerprint element size range 302 of three to four words. The method therefore proceeds to step 406, where a determination is made of whether the current semantic construct includes nested semantic constructs. The current semantic construct is the entire document 7, which includes sentences s1 622 and s2 604. The method therefore proceeds to step 410 where the method of FIG. 4 is recursed for each of the sentences s1 622 and s2 604.

Considering first a recursion of the method of FIG. 4 for the sentence s1 622, step 402 determines if the size of the sentence s1 622 is within the fingerprint element size range 302. Sentence s1 622 includes seven words ('a', 'b', 'c', 'd', 'e', 'f', and 'x') and is therefore outside the fingerprint element size range 302 of three to four words. The method therefore proceeds to step 406, where a determination is made of whether the sentence s1 622 includes nested semantic constructs. Sentence s1 622 does not include nested semantic constructs and so the method proceeds to step 408. At step 408 sentence s1 622 is divided into new fingerprint elements, each fingerprint element having a size which falls within the fingerprint element size range 302 of three to four words. Thus, sentence s1 622 can be divided into two fingerprint elements: {'a', 'b', 'c' } and {'d', 'e', 'f', 'x' }.

Considering next a recursion of the method of FIG. 4 for the sentence s2 604 of document 7, it is noted that this is identical to the sentence s2 604 of document 6. Thus, the recursion of the method of FIG. 4 for the sentence 604 of document 7 is identical to that described above with respect to document 6 which resulted in two further fingerprint elements: {'g', 'h', 'i' }; and {'j', 'k', 'l'}. Thus, in summary, four fingerprint elements 3082 were generated for document 7: {'a', 'b', 'c' }; {'d', 'e', 'f', 'x'}; {'g', 'h', 'i' }; and {'j', 'k', 'l'}.

FIG. 6d is a representation of a fingerprint 70 consisting of fingerprint elements 3082 having sizes in the range of three to four words for the document 7 of FIG. 6c in accordance with a preferred embodiment of the present invention. FIG. 6d is also annotated to include an indication of which fingerprint elements 3082 correspond to the semantic constructs of document 7. Thus, set of fingerprint elements 632 corresponds to the words included in sentence s1 622. Set of fingerprint elements 614 corresponds to the words included in sentence s2 604. Further, set of fingerprint elements 614 includes subset 616 corresponding to clause c1 606 and subset 618 corresponding to clause c2 608.

It is noted that the insertion of the word 'x' in document 7 as compared with document 6 has resulted in a change to the fingerprint 70. The change in fingerprint 70 as compared with fingerprint 60 has affected only those fingerprint elements 3082 which correspond to the sentence s1 622 in which the word 'x' was inserted. The sets of fingerprint elements 614, 616 and 618 corresponding to the other semantic constructs sentence s2 604 and clauses c1 606 and c2 608 respectively are not affected by the insertion of the word 'x'. Thus the method of FIG. 4 provides that changes to the content of a single semantic construct in the document 7 will result in changes to only those fingerprint elements which correspond to that semantic construct.

Figure 6E:
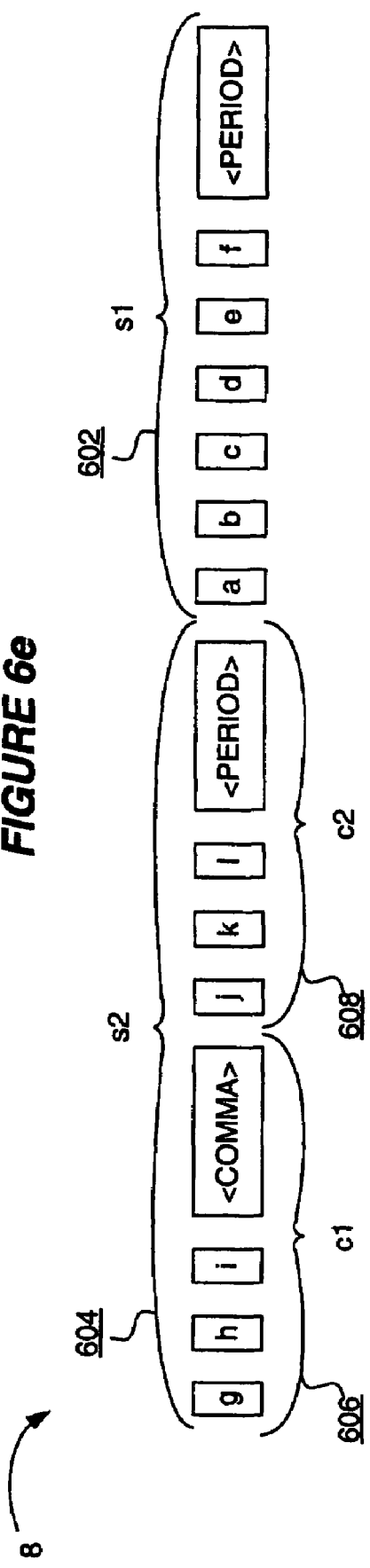
FIG. 6e is a representation of a document which corresponds to the document of FIG. 6a with the sentence s1 swapped with the sentence s2.

FIG. 6e is a representation of a document 8 which corresponds to the document 6 of FIG. 6a with the sentence s1 602 swapped with the sentence s2 604. In every other way the document 8 is identical to the document 6 and shall not be described in further detail. Document 8 will now be considered for the method of the fingerprint generator 306 of FIG. 4 with a fingerprint element size range 302 of three to four words and the semantic construct precedence of Table 1. Taking a first semantic construct as the entire document 8, step 402 determines if the size of the current semantic construct is within the fingerprint element size range 302. The entire document 7 includes twelve words ('g', 'h', 'i', 'j', 'k', 'l', 'a', 'b', 'c', 'd', 'e', and 'f') and is therefore outside the fingerprint element size range 302 of three to four words. The method therefore proceeds to step 406, where a determination is made of whether the current semantic construct includes nested semantic constructs. The current semantic construct is the entire document 8, which includes sentences s2 604 and s1 602. The method therefore proceeds to step 410 where the method of FIG. 4 is recursed for each of the sentences s2 604 and s1 602.

Considering first a recursion of the method of FIG. 4 for the sentence s2 604, step 402 determines if the size of the sentence s2 604 is within the fingerprint element size range 302. Sentence s2 604 includes six words ('g' to 'l') and is therefore outside the fingerprint element size range 302 of three to four words. The method therefore proceeds to step 406, where a determination is made of whether the sentence s2 604 includes nested semantic constructs. Sentence s2 604 does include nested semantic constructs: clauses c1 606 and c2 608. The method therefore proceeds to step 410 where the method of FIG. 4 is recursed for each of the clauses c1 606 and c2 608.

Considering first a recursion of the method of FIG. 4 for the clause c1 606 of sentence s2 604, step 402 determines if the size of clause c1 606 is within the fingerprint element size range 302. Clause c1 606 includes three words ('g', 'h' and 'i') and is therefore inside the fingerprint element size range 302 of three to four words. The method therefore proceeds to step 404 where a new fingerprint element is generated containing clause c1 606. Thus, from clause c1 606 the fingerprint element {'g', 'h', 'i' } is generated.

Considering now a recursion of the method of FIG. 4 for the clause c2 608 of sentence s2 604, step 402 determines if the size of clause c2 608 is within the fingerprint element size range 302. Clause c2 608 includes three words ('j', 'k' and 'l') and is therefore inside the fingerprint element size range 302 of three to four words. The method therefore proceeds to step 404 where a new fingerprint element is generated containing clause c2 608. Thus, from clause c2 608 the fingerprint element {'j', 'k', 'l' } is generated.

Considering next a recursion of the method of FIG. 4 for the sentence s1 602, step 402 determines if the size of the sentence s1 602 is within the fingerprint element size range 302. Sentence s1 602 includes six words ('a' to 'f') and is therefore outside the fingerprint element size range 302 of three to four words. The method therefore proceeds to step 406, where a determination is made of whether the sentence s1 602 includes nested semantic constructs. Sentence s1 602 does not include nested semantic constructs and so the method proceeds to step 408. At step 408 sentence s1 602 is divided into new fingerprint elements, each fingerprint element having a size which falls within the fingerprint element size range 302 of three to four words. Thus, sentence s1 602 can be divided into two fingerprint elements: {'a', 'b', 'c' } and {'d', 'e', 'f'}.

Figure 6F:
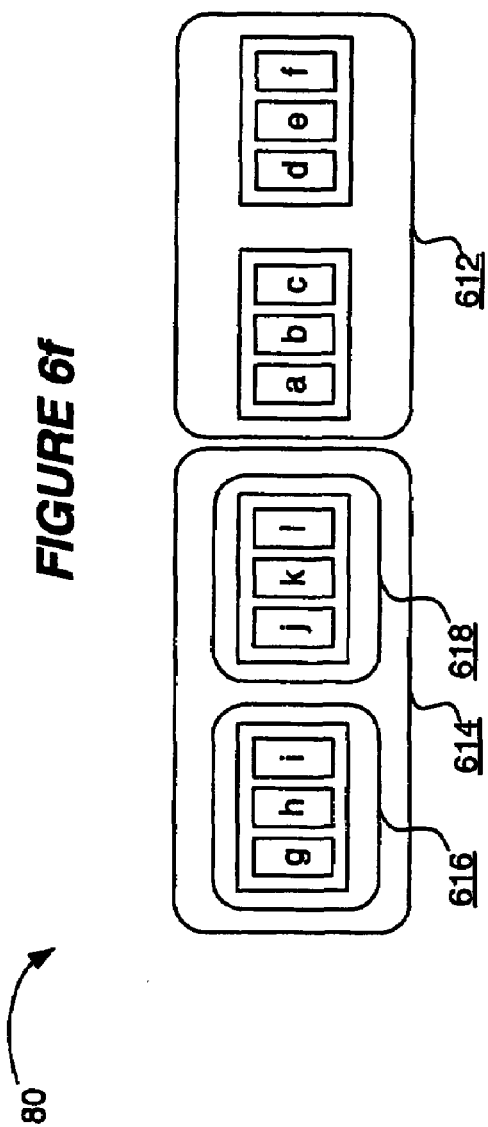
FIG. 6f is a representation of a fingerprint consisting of fingerprint elements having sizes in the range of three to four words for the document of FIG. 6e in accordance with a preferred embodiment of the present invention.

At this point, recursions for clause c1 606, clause c2 608, sentence s2 604 and sentence s1 602 are complete and the method of FIG. 4 terminates. In summary, four fingerprint elements 3082 were generated for document 8: {'g', 'h', 'i' }; {'j', 'k', 'l'}; {'a', 'b', 'c' }; and {'d', 'e', 'f'}. FIG. 6f is a representation of a fingerprint 80 consisting of fingerprint elements 3082 having sizes in the range of three to four words for the document 8 of FIG. 6a in accordance with a preferred embodiment of the present invention. It is noted that swapping the order of sentences s1 602 and s2 604 in document 8 as compared with document 6 has resulted in a fingerprint 80 which comprises the same set of fingerprint elements 612 to 618 as the fingerprint 60 generated for document 6. Thus it can be seen that changes to the semantic structure of a document which does not change the substantive content of the document (such as moving sentences around within a document) results in no change to a fingerprint for the document in this example. It is also true that, in general, changes to the semantic structure of the document will only affect fingerprint elements relating to the changed semantic constructs.

Figure 7A:
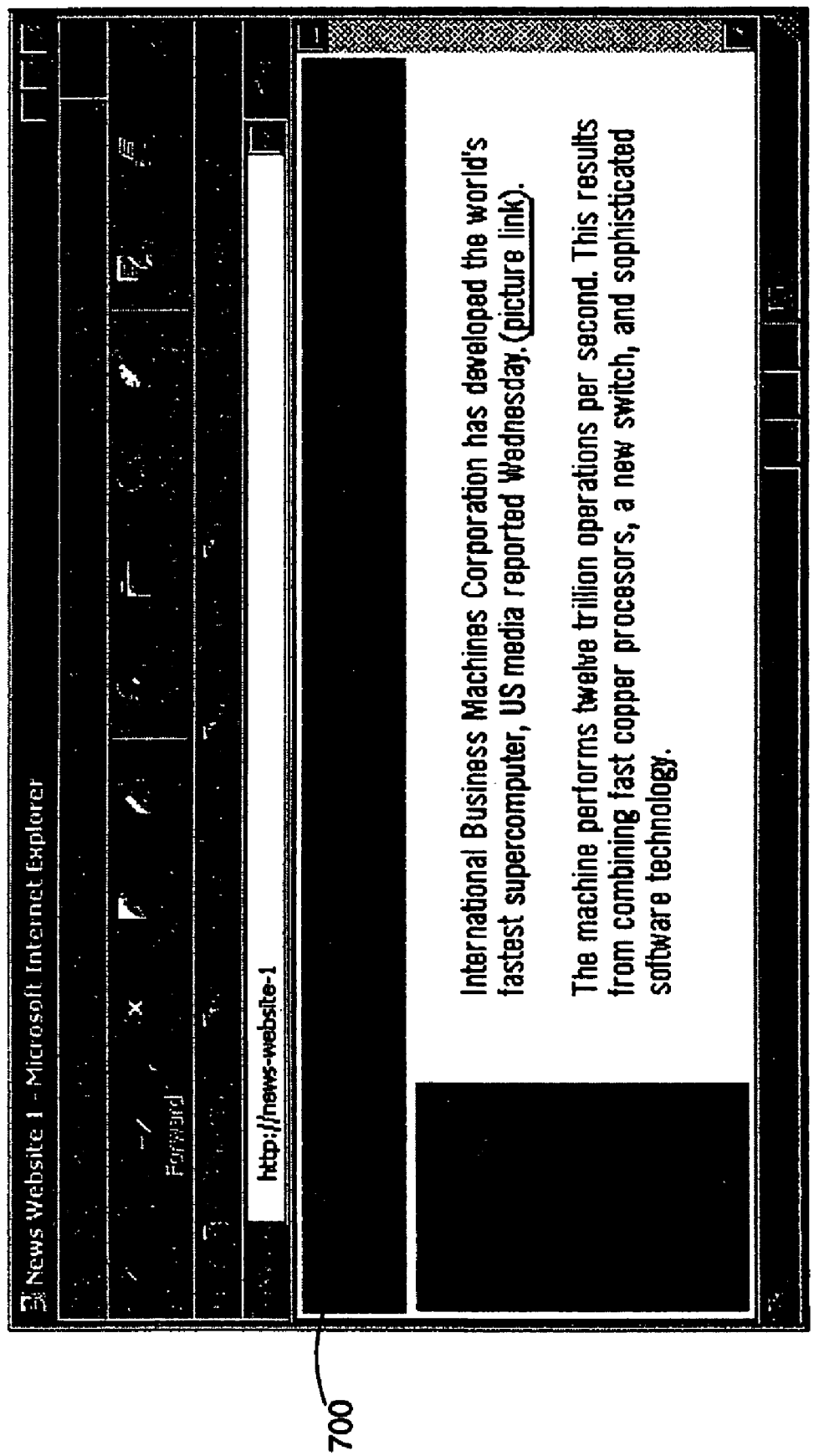
FIG. 7a is an illustration of a web browser including a first web page for processing by a method in accordance with a preferred embodiment of the present invention.
Figure 8A:
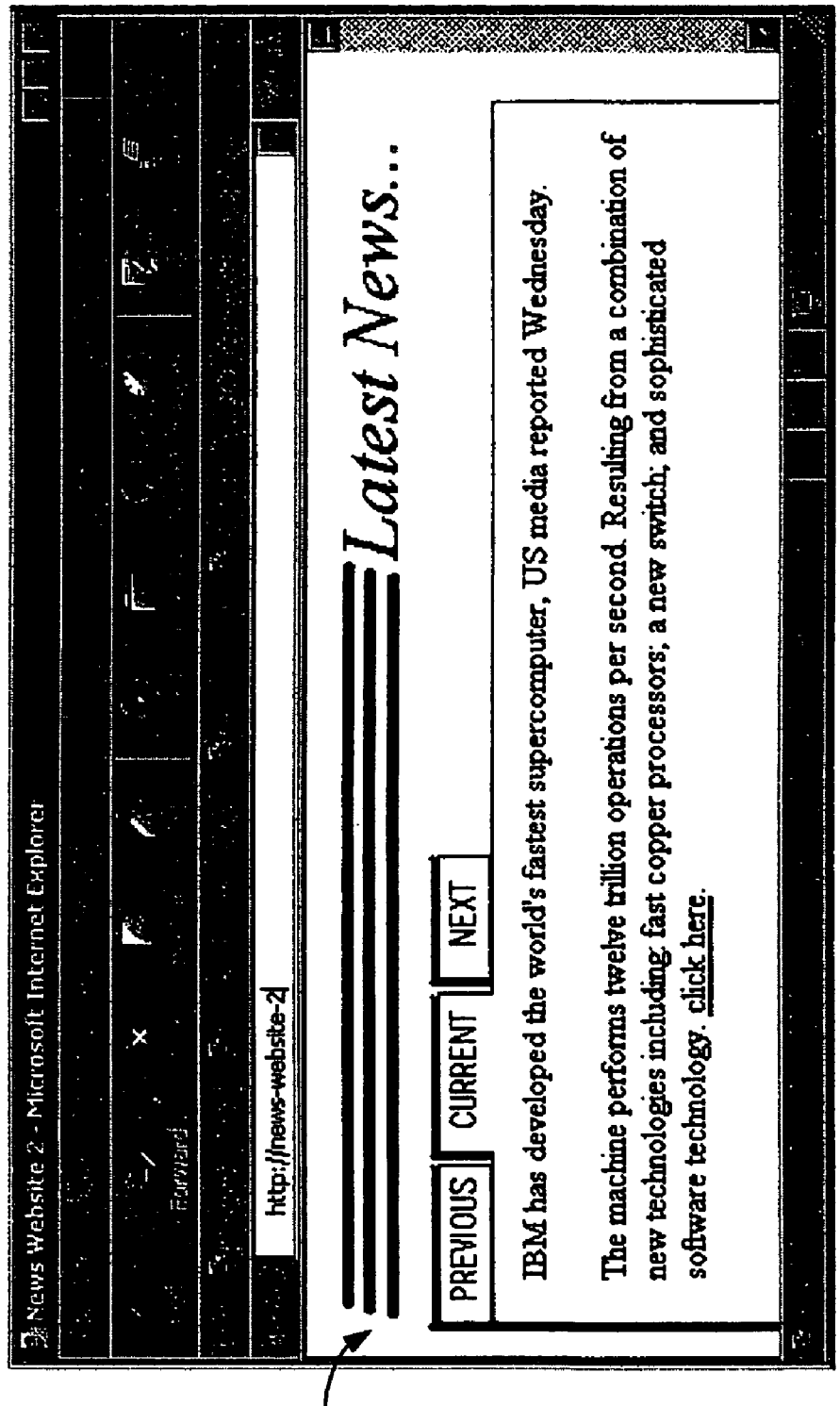
FIG. 8a is an illustration of a web browser including a second web page for processing by a method in accordance with a preferred embodiment of the present invention.

The method of FIG. 4 and comparator of FIG. 5 will now be further considered in use for comparing the substantive content of two web pages by way of example only. FIG. 7a is an illustration of a web browser including a first web page 700 for processing by a method in accordance with a preferred embodiment of the present invention. FIG. 8a is an illustration of a web browser including a second web page 800 for processing by a method in accordance with a preferred embodiment of the present invention. It can be seen from reading the text of the web pages 700 and 800 that each is a news page including navigation links (such as "HOME" and "CONTACT US" on web page 700, and "PREVIOUS" and "NEXT" on web page 800). Each of the web pages 700 and 800 also includes a heading ("NEWS WEBSITE" on web page 700, and "Latest News . . . " On web page 800). Further, each of the web pages 700 and 800 includes a news item which can be considered to be the substantive content of each document. Thus, the substantive content of web page 700 starts with "International Business Machines" and ends with "sophisticated software technology". Note, however, that a hypertext link "picture link" is also included within this body of text, and that this is not considered to form part of the substantive content of the web page 700. Similarly, web page 800 includes substantive content beginning with "IBM has developed" and ending with "sophisticated software technology". Note also that a hypertext link "click here" is also included in this body of text which is also not considered to form part of the substantive content of the web page 800. Whilst each of the two web pages 700 and 800 has a different appearance, different hypertext links, different titles and slightly different text and punctuation, it is considered that the two documents have substantially the same substantive content. That is to say that the substantive content of each document has the same meaning and purpose.

Figure 7B:
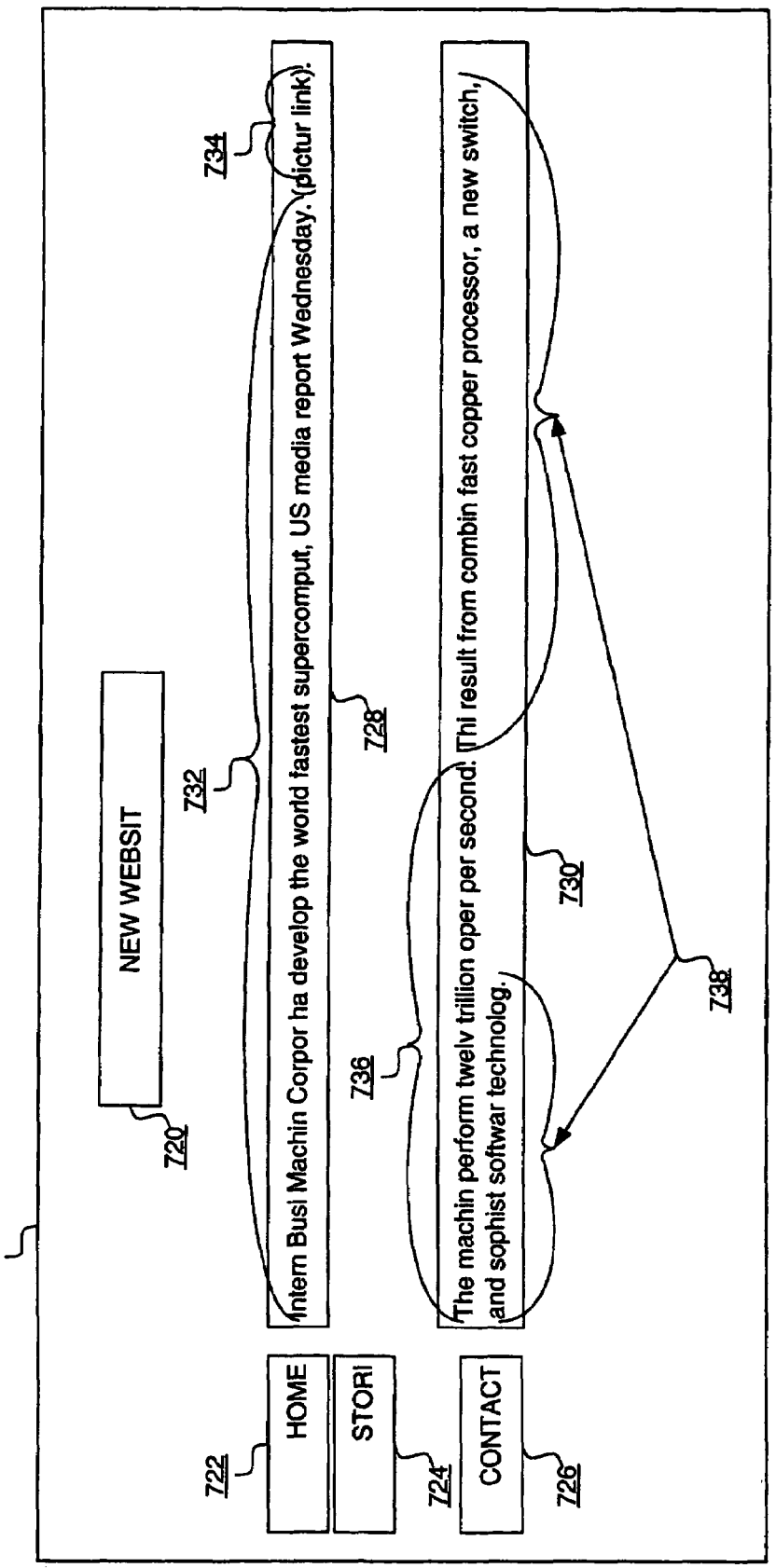
FIG. 7b is a representation of the web page of FIG. 7a which has been word stemmed using a word stemming algorithm known in the art.

A fingerprint for each of the web pages 700 and 800 will now be generated using the method of FIG. 4 and the resulting fingerprints will be compared using the fingerprint comparator 506 of FIG. 5 to determine the similarity of the two web pages 700 and 800. Considering web page 700 first, the page is initially word stemmed using word stemmer 310. FIG. 7b is a representation of the web page 700 of FIG. 7a which has been word stemmed using a word stemming algorithm known in the art. The word stemmed document 702 includes semantic constructs as follows. Word stemmed document 702 includes paragraphs 720 (the title), 722 (the "HOME" hyperlink), 724 (the "STORIES" hyperlink), 726 (the "CONTACT US" hyperlink), 728 and 730. Each of these paragraphs includes at least one sentence. For example, paragraph 720 includes a single sentence with the content "NEW WEBSIT". Similarly paragraphs 722, 724 and 726 include a single sentence each. Paragraph 728 includes two sentences 732 and 734. Paragraph 730 also includes two sentences 736 and 738. It is noted that sentence 732 further includes two comma separated clauses. Similarly, sentence 738 includes three comma separated clauses.

The stemmed document 702 will now be considered for the method of the fingerprint generator 306 of FIG. 4 with a fingerprint element size range 302 of three to four words and the semantic construct precedence of Table 1. Taking a first semantic construct as the entire stemmed document 702, step 402 determines if the size of the current semantic construct is within the fingerprint element size range 302. The entire stemmed document 702 includes forty one words and is therefore outside the fingerprint element size range 302 of three to four words. The method therefore proceeds to step 406, where a determination is made of whether the current semantic construct includes nested semantic constructs. The current semantic construct is the entire word stemmed document 702, which includes multiple paragraphs 720 to 730. The method therefore proceeds to step 410 where the method of FIG. 4 is recursed for each of the paragraphs 720 to 730.

Considering first a recursion of the method of FIG. 4 for paragraph 720, step 402 determines if the size of paragraph 720 is within the fingerprint element size range 302. Paragraph 720 includes two words ("NEW" and "WEBSIT") and is therefore outside the fingerprint element size range 302 of three to four words. The method therefore proceeds to step 406, where a determination is made of whether paragraph 720 includes nested semantic constructs. Paragraph 720 does not include nested semantic constructs and so the method proceeds to step 408. At step 408 paragraph 720 is divided into new fingerprint elements each having a size which falls within the fingerprint element size range 302 of three to four words. Since the whole of paragraph 720 is smaller than the minimum fingerprint element size of three words paragraph 720 is discarded with no fingerprint elements.

Considering now a recursion of the method of FIG. 4 for paragraphs 722, 724 and 726. These paragraphs include no nested semantic constructs and are smaller than the minimum fingerprint element size of three words and so these paragraphs are also discarded with no fingerprint elements.

Considering now a recursion of the method of FIG. 4 for paragraph 728, step 402 determines if the size of paragraph 728 is within the fingerprint element size range 302. Paragraph 728 includes sixteen words and is therefore outside the fingerprint element size range 302 of three to four words. The method therefore proceeds to step 406, where a determination is made of whether paragraph 728 includes nested semantic constructs. Paragraph 728 does include nested semantic constructs: sentence 732; and sentence 734. The method therefore proceeds to step 410 where the method of FIG. 4 is recursed for each of sentence 732 and sentence 734.

Considering now a recursion of the method of FIG. 4 for sentence 732, step 402 determines if the size of sentence 732 is within the fingerprint element size range 302. Sentence 732 includes fourteen words and is therefore outside the fingerprint element size range 302 of three to four words. The method therefore proceeds to step 406, where a determination is made of whether sentence 732 includes nested semantic constructs. Sentence 732 does include nested semantic constructs: a first clause before the comma of sentence 732; and a second clause after the comma of sentence 732. The method therefore proceeds to step 410 where the method of FIG. 4 is recursed for each of the clauses of sentence 732.

Considering now a recursion of the method of FIG. 4 for the clause before the comma of sentence 732, step 402 determines if the size of the clause is within the fingerprint element size range 302. The clause before the comma of sentence 732 includes ten words and is therefore outside the fingerprint element size range 302 of three to four words. The method therefore proceeds to step 406, where a determination is made of whether the clause before the comma of sentence 732 includes nested semantic constructs. The clause before the comma of sentence 732 does not include nested semantic constructs and so the method proceeds to step 408. At step 408 the clause before the comma of sentence 732 is divided into new fingerprint elements, each fingerprint element having a size which falls within the fingerprint element size range 302 of three to four words. Thus, the clause before the comma of sentence 732 can be divided into three fingerprint elements: {"Intern", "Busi", "Machin", "Corpor"}; {"ha", "develop", "the"}; and {"world", "fastest", "supercomput"}.

Considering now a recursion of the method of FIG. 4 for the clause after the comma of sentence 732, step 402 determines if the size of the clause is within the fingerprint element size range 302. The clause after the comma of sentence 732 includes four words and is therefore inside the fingerprint element size range 302 of three to four words. The method therefore proceeds to step 404 where a new fingerprint element containing the clause after the comma of sentence 732 is generated a: {"US", "media", "report", "Wednesday"}.

Considering now a recursion of the method of FIG. 4 for sentence 734, step 402 determines if the size of sentence 734 is within the fingerprint element size range 302. Sentence 734 includes two words ("pictur" and "link") and is therefore outside the fingerprint element size range 302 of three to four words. The method therefore proceeds to step 406, where a determination is made of whether sentence 734 includes nested semantic constructs. Sentence 734 does not include nested semantic constructs and so the method proceeds to step 408. At step 408 sentence 734 is divided into new fingerprint elements each having a size which falls within the fingerprint element size range 302 of three to four words. Since there whole of sentence 734 is smaller than the minimum fingerprint element size of three words sentence 734 is discarded with no fingerprint elements. Thus, paragraph 728 has been processed to generate four fingerprint elements {"Intern", "Busi", "Machin", "Corpor"}; {"ha", "develop", "the"}; {"world", "fastest", "supercomput"}; and {"US", "media", "report", "Wednesday"}.

Continuing to follow the method of FIG. 4 for paragraph 738, six further fingerprint elements are generated as: {"The", "machin", "perform", "twelv"}; {"trillion", "oper", "per", "second"}; {"Thi", "result", "from", "combin"}; {"fast", "copper", "processor"}; {"a", "new", "switch"}; and {"and", "sophist", "sofwar", "technolog"}.

Thus, a complete fingerprint 308 for the word stemmed document 702 includes the following set of fingerprint elements: {"Intern", "Busi", "Machin", "Corpor"}; {"ha", "develop", "the"}; {"world", "fastest", "supercomput"}; {"US", "media", "report", "Wednesday"}; {"The", "machin", "perform", "twelv"}; {"trillion", "oper", "per", "second"}; {"Thi", "result", "from", "combin"}; {"fast", "copper", "processor"}; {"a", "new", "switch"}; and {"and", "sophist", "sofwar", "technolog"}.

Considering now web page 800, the page is initially word stemmed using word stemmer 310. FIG. 8b is a representation of the web page 800 of FIG. 8a which has been word stemmed using a word stemming algorithm known in the art. The word stemmed document 802 includes semantic constructs as follows. Word stemmed document 802 includes paragraphs 820 (the title), 822 (the "PREVIOUS" hyperlink), 824 (the "CURRENT" hyperlink), 826 (the "NEXT" hyperlink), 828 and 830. Each of these paragraphs includes at least one sentence. For example, paragraph 820 includes a single sentence with the content "Latest New". Similarly paragraphs 822, 824 and 826 include a single sentence each. Paragraph 828 includes a single sentence 832. Paragraph 830 includes two sentences 834 and 836. It is noted that sentence 832 further includes two comma separated clauses. Similarly, sentence 834 includes five colon and semicolon separated clauses.

The method of FIG. 4 is applied to each of the paragraphs of FIG. 8b in the same way as for FIG. 7b to produce a fingerprint 308. The fingerprint produced following this method of FIG. 4 includes the set of fingerprint elements below: {"IBM", "ha", "develop", "the"}; {"world", "fastest", "supercomput"}; {"US", "media", "report", "Wednesday"}; {"The", "machin", "perform", "twelv"}; {"trillion", "oper", "per", "second"}; {"result", "from", "a", "combin"}; {"of", "new", "technolog", "includ"}; {"fast", "copper", "processor"}; {"a", "new", "switch"}; and {"and", "sophist", "softwar", "technolog"}.

Having now generated a fingerprint for each of the word stemmed documents 702 and 802 it is possible to compare the substantive content of the original web pages 700 and 800 by a comparison of the fingerprints using the formula:

$$C(A, B) = \frac{|A \cap B|}{|A|}$$

Where A is the fingerprint for stemmed document 702 and B is the fingerprint for stemmed document 802. In this particular example, this can be calculated as:

$$C(A, B) = \frac{|A \cap B|}{|A|} = \frac{7}{10} = 0.7$$

since seven of the fingerprint elements from the set of fingerprint elements for stemmed document 702 intersect with the set of fingerprint elements for stemmed document 802. This index of '0.7' or 70% provides an accurate quantification of the similarity of the web pages 700 and 800 whilst disregarding supplementary content of the web pages (such as the titles and hypertext links).

The invention claimed is:

1. A method for generating a set of one or more elements of a fingerprint for a document, the document comprising a semantic construct having a plurality of text portions comprising one or more ordered words, the method comprising:

defining a range of sizes for a fingerprint element, wherein the range of sizes comprises a minimum size and a maximum size;

determining, for each text portion of the document, whether a size of the text potion is equal to or greater than the minimum size and equal to or less than the maximum size of the range of sizes for a fingerprint element;

excluding one or more text portions of the document from inclusion as a mutually exclusive fingerprint element in a set of one or more mutually exclusive fingerprint elements if a size of the one or more text portions is not equal to or greater than the minimum size and is not equal to or less than the maximum size of the range of sizes for the fingerprint element;

dividing the ordered words of the semantic construct into the set of one or more mutually exclusive fingerprint elements, wherein each of the one or more mutually exclusive fingerprint elements includes a number of adjacent words, the number being within the range of sizes for a fingerprint element; and comparing a first document with a second document, wherein comparing the first document with the second document comprises:
- generating a first set of fingerprint elements from the first document;
- generating a second set of fingerprint elements from the second document; and
- calculating a similarity index as a size of an intersect of the first set of fingerprint elements and the second set of fingerprint elements divided by a size of the first set of fingerprint elements.

2. The method of claim 1 further comprising:
separating the semantic construct into a plurality of nested semantic constructs, each of the nested semantic constructs having one or more ordered words; and
dividing the ordered words of each of the nested semantic constructs into a set of one or more mutually exclusive fingerprint elements, wherein each of the one or more mutually exclusive fingerprint elements includes a number of adjacent words, the number being within the range of sizes for a fingerprint element.

3. The method of claim 2, further comprising:
defining an order of precedence of semantic constructs within the document, wherein said dividing the ordered words of the nested semantic constructs further comprises dividing the ordered words into nested semantic constructs in accordance with the order of precedence of semantic constructs.

4. The method of claim 1, wherein the minimum size and maximum size of the range of sizes for a fingerprint element includes a minimum number of words and a maximum number of words, respectively.

5. The method of claim 1, further comprising: performing a word stemming operation on the one or more ordered words prior to dividing the ordered words of the semantic construct into the set of one or more mutually exclusive fingerprint elements.

* * * * *